March 23, 1926.  1,577,966
H. HANSEN
WAVE MOTOR
Filed Jan. 22, 1924     2 Sheets-Sheet 1
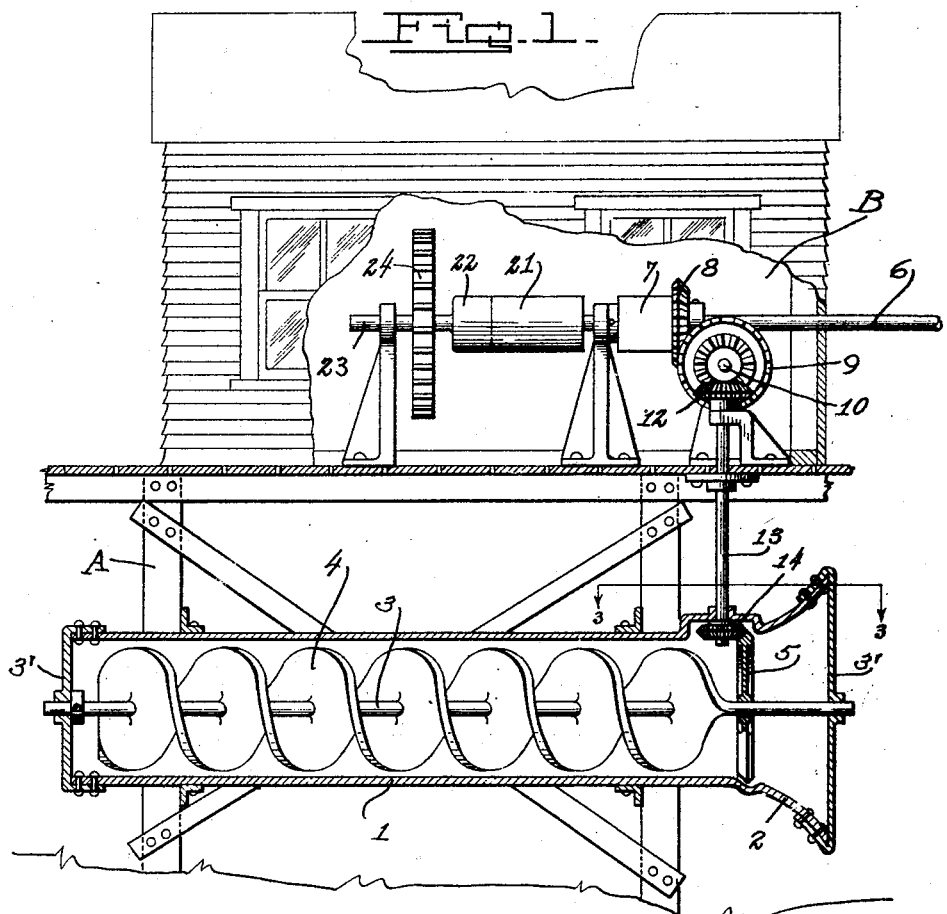
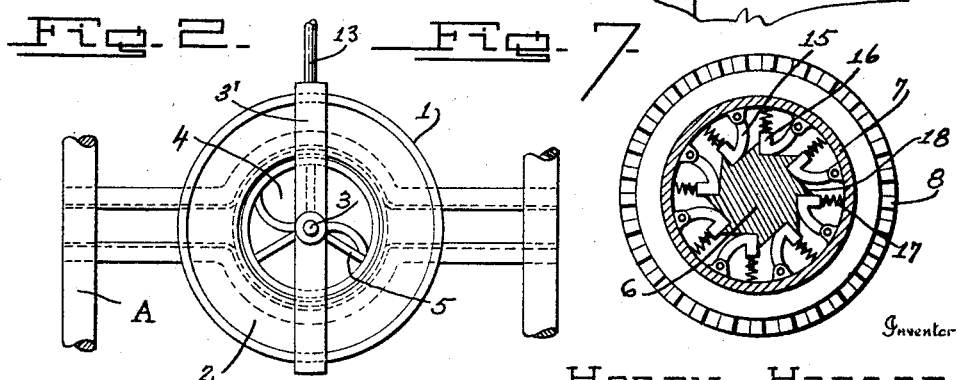
Inventor
Henry Hansen
By Jacobi & Jacobi
Attorneys March 23, 1926.  1,577,966
H. HANSEN
WAVE MOTOR
Filed Jan. 22, 1924  2 Sheets-Sheet 2
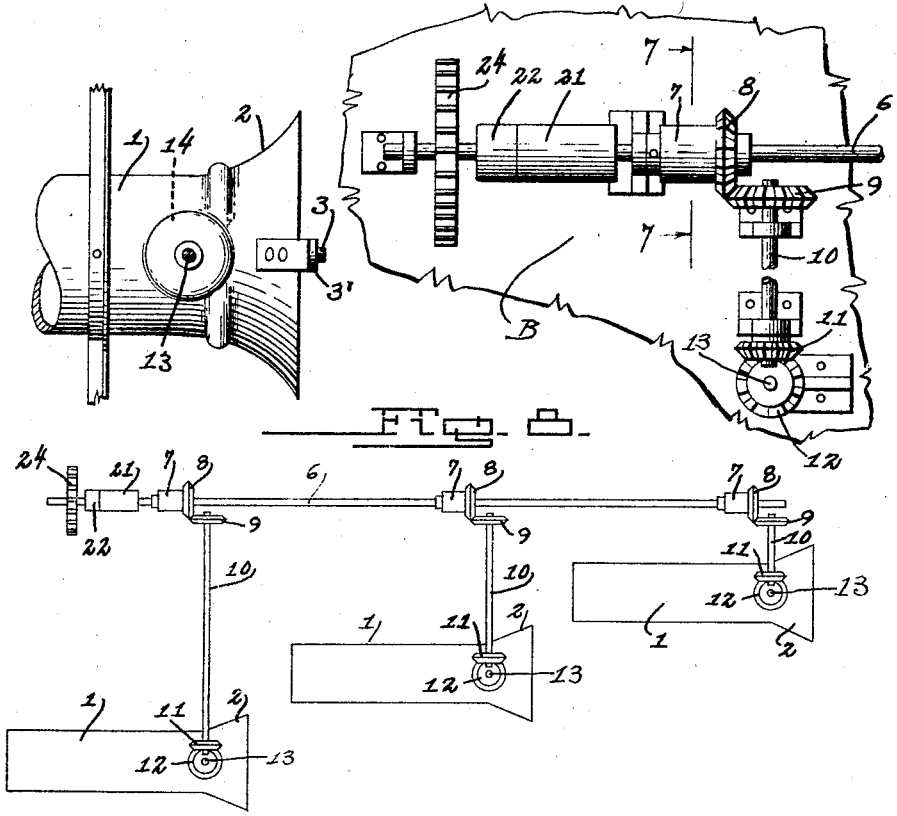
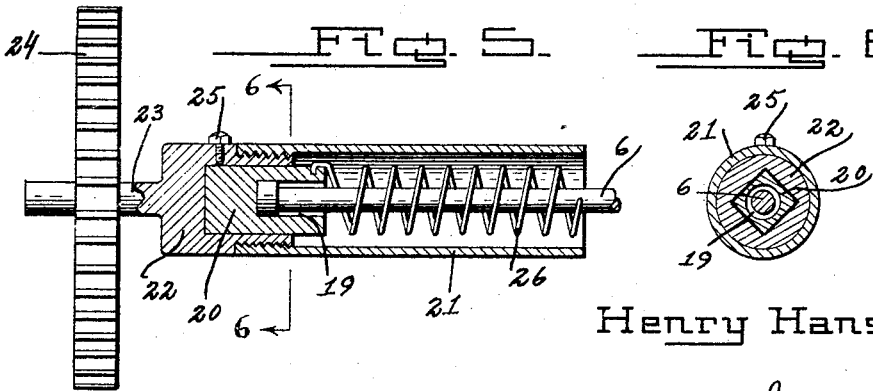
Inventor
Henry Hansen
By Jacoli & Jacoli
Attorneys Patented Mar. 23, 1926.

1,577,966

UNITED STATES PATENT OFFICE.

HENRY HANSEN, OF BISBEE, ARIZONA.

WAVE MOTOR.

Application filed January 22, 1924. Serial No. 687,743.

*To all whom it may concern:*

Be it known that HENRY HANSEN, a citizen of the United States, residing at Bisbee, in the county of Cochise and State of Arizona, has invented certain new and useful Improvements in Wave Motors, of which the following is a specification.

This invention relates to a wave motor and has for its principal object to provide a device wherein the waves are utilized for the purpose of producing motive power.

One of the important objects of the present invention resides in the production of a wave motor wherein means is provided for storing up motive power whereby the same is used to drive various parts of machinery to which the device may be connected.

A further object of the invention is to provide a wave motor of the above mentioned character, which comprises a plurality of screw propellers adapted for actuation by the waves whereby a greater amount of energy or motive power may be obtained.

A still further object of the invention is to provide a wave motor of the above mentioned character, which is simple in construction, strong and durable and further well adapted for the purposes for which it is designated.

Another important object of the present invention is to provide automatic means in connection with the wave motor for keeping the spring in a wound position, thereby assuring the positive operation of the mechanism to which the wave motor is connected.

Other objects and advantages of this invention will become apparent during the course of the following description.

In the accompanying drawings forming a part of this specification and in this like numerals designate like parts throughout the same,—

Figure 1 is a sectional view of the propelling means with the other parts associated therewith.

Figure 2 is a front end elevation of the conduit.

Figure 3 is a detail sectional view taken on line 3—3 of Fig. 1 looking in the direction of the arrows.

Figure 4 is a top plan view of the driven shaft with the operating means therefor.

Figure 5 is a sectional view of the spring housing.

Figure 6 is a transverse section taken on line 6—6 of Fig. 5.

Figure 7 is a similar view taken on line 7—7 of Fig. 4 and showing the clutch mechanism, and Figure 8 is a diagrammatic view of a series of propellers.

In the drawings wherein for the purpose of illustration is shown the preferred embodiment of my invention, the numeral 1 designates a conduit or tube which may be of any length or diameter as suitable, and is supported in any convenient manner upon the supports A, in the manner as is clearly shown in Fig. 1 of the drawings. The conduit 1 is substantially supported in a horizontal position so as to have the flared end 2 thereof extending in direct communication with the incoming waves. Any number of these conduits or tubes may be provided as is necessary and desirable, it being understood that the more conduits that are used the more motor power will be obtained, and I do not wish to limit myself to any particular number of conduits used. For the purpose of description it is only thought necessary to describe the construction of one of these conduits in order to suffice for the description of all.

Extending longitudinally through the conduit 1 is the screw propeller shaft 3 and carries thereon the usual propeller blades or fins 4. This shaft 3 is journaled at its respective ends in suitable brackets 3' provided at the outer ends of the conduit, these brackets being formed of a strip of metal in the manner as shown in Figs. 1 and 2 of the drawings. Carried by the forward end of the screw propeller shaft 3 and disposed adjacent the flared end 2 of the conduit 1 is the gear wheel 5 the purpose of which will be presently described.

Supported in a suitable housing B at a point in close proximity to the conduits, is the driven shaft 6, this shaft being of a suitable length and extends longitudinally through the housing in the manner as clearly illustrated in Fig. 1 of the drawings. Loosely mounted on the shaft 6 at predetermined intervals, are the sleeves 7. These sleeves are provided at one end thereof with the bevel gear 8 which meshes with a similar bevel gear 9 mounted on one end of a transversely extending shaft 10, which is also supported in any suitable manner within the housing B, the opposite end of the transverse shaft 10 carrying thereon the bevel gear 11 which is adapted to mesh with a similar gear wheel 12 mounted on the upper end of a vertically extending shaft 13. The lower end of this shaft 13 extends through the conduit 1 adjacent the gear wheel 5 carried by the shaft 3, and is furthermore provided with a bevel gear 14 thereon for engagement with the gear wheel 5. It is, of course, to be understood that the vertical shaft 13 is supported by the housing B in a suitable manner.

Each of the sleeves 7 has provided on the inner walls thereof the pivoted dogs 15. The free ends of the pivoted dogs 15 extend upwardly as is shown at 16 in the drawings, and are adapted to be associated with suitable coil springs 17 for the purpose of normally keeping the free end portions 16 of the dogs 15 in engagement with the teeth or notches 18 provided in the driven shaft 6 at the places where the sleeves are mounted on the shaft.

The teeth or notches 18 extend around the driven shaft 6 at predetermined points and are arranged in spaced relation with each other, and this arrangement provides a clutch mechanism the purposes of which will be presently apparent.

The outer end of the driven shaft 6 is adapted to be disposed within a suitable socket 19 provided in the plug 20 and the latter is removably supported within the cylinder 21. This cylinder 21 has one of its ends closed by means of the threaded closure 22. An extension 23 is formed on the closure 22 and is adapted to support the gear wheel 24 thereon whereby the latter may be suitably connected with the desired machinery to be operated in any well known manner. The plug 20 is held within the closure 22 by means of a suitable set screw 25 in the manner as is clearly shown in Fig. 5 of the drawings. Encircling the outer end of the driven shaft 6 and disposed within the cylinder 21 is the coil spring 26. One of the ends of the coil spring 26 is connected to the driven shaft and the other end is adapted to be connected to the removable plug 19 in the manner as shown in the drawings.

The shaft 6 continues rotating at all times and the tension of the spring 26 will give gear wheel 24 a more uniform speed. The pawl and ratchet in cylinder 7 is to relieve shaft 6 from all the propellers at all times except when a wave passes through that certain propeller. In other words, when shaft 6 is rotating faster than cylinder 7, instead of pulling cylinder 7 with it, it will release from cylinder 7 thereby saving power, but when cylinder 7 is rotated faster than shaft 6, the pawls will connect with the ratchets and speed up shaft 6. Shaft 6 can continue rotating and cylinder 7 remain idle. The ratchet causes the spring 17 to wind and the pawls are inoperative. However, the moment a wave passes through the propeller that connects the cylinder, the pawls by the action of the spring 17 connect the ratchet and speed the shaft.

The operation of my wave motor may be briefly stated as follows: The conduits are placed in a manner as shown in Fig. 8 of the drawings and as many conduits may be used as seen fit, it being understood that the flared ends of the conduits are in direct communication with the incoming waves and as many sleeves 7 and gearing therefor are provided as there are conduits. The waves which enter the conduits through the flared ends thereof will pass through the same and by coming in contact with the propeller blades of the propeller shaft 3, the latter will be rotated so as to cause the rotation of the gear 5 carried by the forward end of the propeller shaft, the gear wheel 5 in turn causing the rotation of the transverse shaft 10. The bevel gear 9 carried by the inner end of the transverse shaft 10 will rotate the sleeve 7 through the medium of the gear 8 and the rotation of the sleeve 7 will cause the dogs 15 to have their free end portions 16 engaging the notches 17 provided in the shaft 6 and consequently cause the rotation of the driven shaft 6. The rotation of the driven shaft 6 will cause the spring 26 carried by the outer end of the shaft to be wound therearound thus enabling the gear wheel 24 to drive the machinery to which the same is connected, in a manner which is obviously apparent from the disclosure and the above description.

It is to be further noted that by providing a number of conduits with propeller shafts therein the same will be connected to the driven shaft 6, in the manner as heretofore clearly described, so that the spring 26 will at all times be maintained in a wound position, thus preventing the possibility of the machinery to which the gear wheel 24 is connected from being inoperative. The arrangement of the series of conduits is also immaterial, it being only necessary to align the conduits in a manner which will best receive the waves and assure the proper operation of the device.

The simplicity in which the several parts of my device are associated enables the wave motor to store up a sufficient amount of motor power necessary to operate the machinery connected thereto and furthermore the parts are so arranged as to enable a person to have ready access thereto without causing any considerable loss of time or injury to the device. Furthermore a wave motor of this construction can be manufactured at a very low cost.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to, without departing from the spirit or sacrificing any of the principles of the invention.

Having thus described my invention what I claim as new and desire to secure by Letters Patent is:—

1. A wave motor of the class described comprising a driven shaft, means for actuating the same, a plug loosely mounted on the outer end of said shaft, a coil spring encircling the outer end of said shaft, said spring having one end thereof connected to said shaft and the opposite end being connected to said plug, a cylinder, means for locking said plug within said cylinder, and a gear wheel carried by said cylinder.

2. A wave motor of the class described comprising a driven shaft, means for actuating the same, a plug supported on the outer end of said shaft, a cylinder having one end thereof closed and provided with a seat for receiving said plug, means for locking said plug within said cylinder, an extension formed on the closed end of said cylinder, a gear wheel thereon, and a coil spring encircling the outer end of said driven shaft and being connected to said shaft and to said plug respectively.

3. In a wave motor, a driven shaft, means for actuating the same, a cylindrical member receiving a portion of said shaft therethrough, one end of said cylindrical member being internally threaded, a head member having a reduced externally threaded portion formed thereon engaged with the threaded end of said cylindrical member to form a closure for one end of the latter, said head member having its inner face provided with a socket, a plug removably mounted in the socket of said head member, said plug having its inner end provided with a recess frictionally receiving the end of said driven shaft therein, a set screw extending laterally through said head member and adapted for frictional contact with the plug to lock the latter against longitudinal movement in the socket, a coil spring encircling said driven shaft having one end engaged with the latter and its opposite end engaged with said plug, a stub shaft formed integral with the outer end of said head member, and a gear keyed to said stub shaft, as and for the purposes described.

4. In a wave motor, a driven shaft, means for actuating the same, the outer end of said shaft being provided with an enlargement, a cylinder receiving said driven shaft therethrough having its outer end internally threaded, a head member provided with a reduced externally threaded portion engaged with the internally threaded end of said cylinder to form a closure for one end of the latter, said head member being provided from its inner end with a socket designed rectangular in cross-section, a plug designed square in cross-section fitting in the aforesaid socket and projecting within said cylinder, the inner end of said plug being provided with a recess frictionally receiving the enlarged end of said shaft therein, a set screw extending through said head member and engaging the plug to prevent longitudinal movement of the latter in said socket, a coil spring encircling the shaft having one end thereof engaged with the latter and the opposite end engaged with said plug, a stub shaft formed integral with the outer face of said head member, and a gear carried on said stub shaft, as and for the purposes described.

In testimony whereof I affix my signature.

HENRY HANSEN.